March 18, 1958 R. H. ZEILMAN 2,827,345
BALL BEARING
Filed Oct. 17, 1955 2 Sheets-Sheet 1
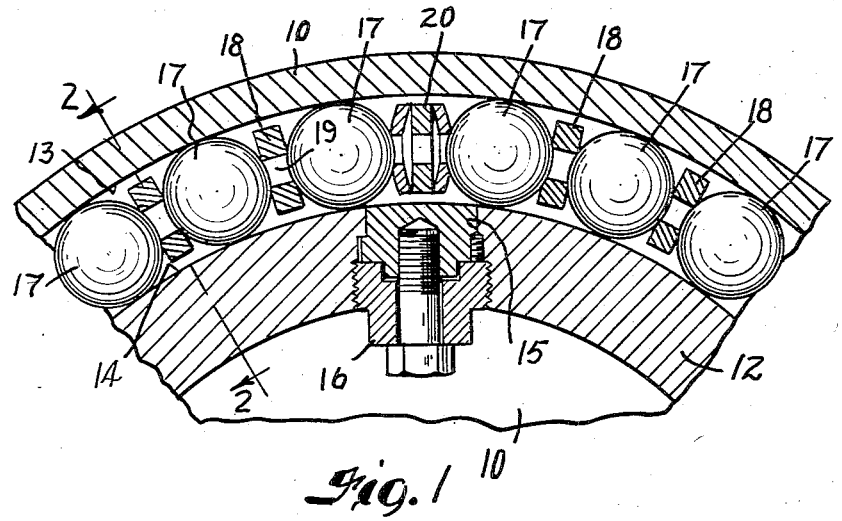
Fig. 1
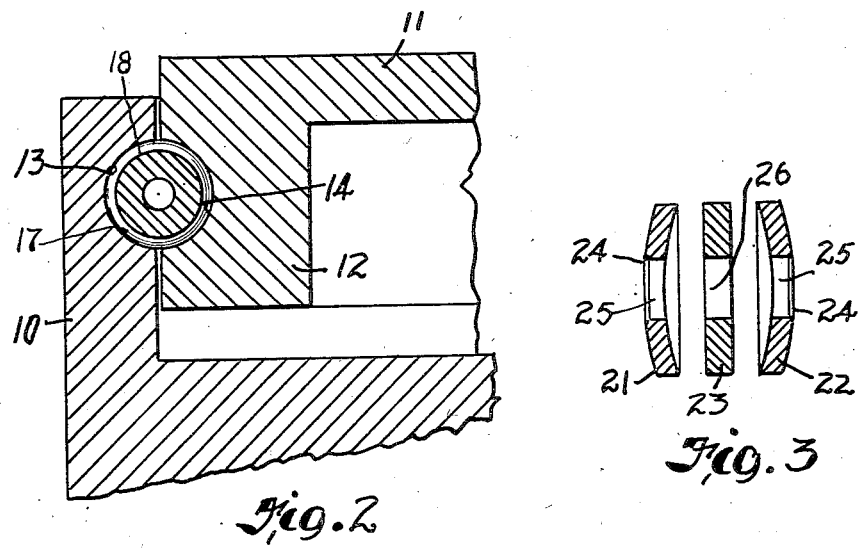
Fig. 2
Fig. 3
INVENTOR.
ROY H. ZEILMAN
BY
Oberlin & Limbach
ATTORNEYS.

March 18, 1958    R. H. ZEILMAN    2,827,345
BALL BEARING

Filed Oct. 17, 1955    2 Sheets-Sheet 2

INVENTOR.
ROY H. ZEILMAN
BY
Oberlin + Limbach
ATTORNEYS.

United States Patent Office 2,827,345
Patented Mar. 18, 1958

2,827,345

BALL BEARING

Roy H. Zeilman, Elyria, Ohio, assignor to The Thew Shovel Company, Lorain, Ohio, a corporation of Ohio Application October 17, 1955, Serial No. 540,986

7 Claims. (Cl. 308—199)

This invention relates, as indicated, to ball bearings and more specifically to ball bearings in which the adjacent balls are separated by spacers.

When a ball bearing is employed to facilitate relative rotation between two members which bear against each other with unevenly distributed forces, the balls of the bearing move faster in the bearing zones of increased load than they do in the zones of decreased load. For this reason it is desirable to provide some means in the bearing whereby relative movement of the bearing balls is possible.

It is, therefore, the principal object of my invention to provide a ball bearing in which movement of the balls with respect to each other is possible.

It is a further object of my invention to provide a ball bearing in which means are provided so that the space between two adjacent members of the series of balls and spacers may be enlarged to permit insertion therein of the last member placed in the series and then contracted so that said adjacent members firmly embrace the surface of said last member.

It is a more particular object of my invention to provide a bearing of the type described comprising a series of alternative balls and spacers wherein a plurality of said spacers are resiliently deformable.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a cross-sectional view of a fragment of a ball bearing of my invention taken along a plane perpendicular to the axis of the bearing;

Fig. 2 is a cross-section of the bearing illustrated in Fig. 1 taken along the plane substantially indicated by the line 2—2 in Fig. 1;

Fig. 3 is an exploded view in cross section of the preferred form of the resilient spacer of my invention;

Figure 4:
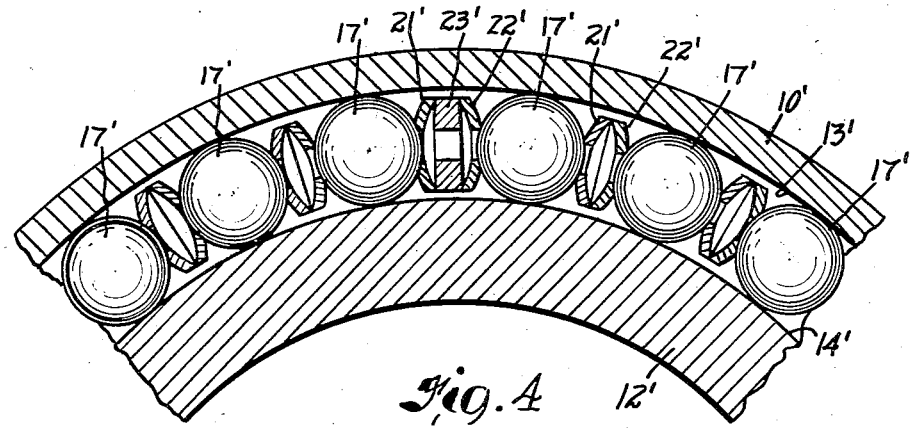
Fig. 4 is a view similar to Fig. 1 showing the preferred bearing of my invention.

Broadly stated my invention comprises a ball bearing comprising a raceway formed of the complementary ball races in the adjacent faces of two bearing members and a series of alternate balls and spacers in the raceway, one of the spacers comprising two portions, one of the portions being resiliently deformable centrally thereof toward the other portion.

With reference now to the annexed drawings and in particular to Figs. 1, 2 and 3, 10 designates the frame of the machine in which the bearing of my invention is employed; 11 designates a turntable on that machine, and 12 designates an axially extending flange on said turntable. It should be noted that the outside diameter of the flange 12 is slightly smaller than the inside diameter of the base 10. Provided in the inside wall of the base 10 is a semi-toric ball race 13 complementary to a semi-toric ball race 14 in the outer wall of the flange 12. A loading port 15 is provided in the flange 12 which may be closed by any suitable plug, an example of which is illustrated generally at 16. A series of balls 17 are mounted in the raceway formed by the complementary ball races 13 and 14, and a series of rigid spacers 18 are provided between the adjacent balls 17. It should be noted that the diameter of the spacers 18 is less than the diameter of the raceway in order that the peripheries of the spacers 18 will not contact the walls of the raceway. It should also be noted that a port 19 is provided centrally through each of the spacers 18, said port acting as a lubricant reservoir. A resilient spacer group, generally indicated at 20 in Fig. 1 and illustrated more clearly in Fig. 3, is provided in the series of balls and spacers. The resilient spacer group 20 comprises two resilient dish-shaped members 21 and 22 and a spacer 23 between the concave sides of the members 21 and 22. The members 21 and 22 contain in the convex sides thereof depressions 24 adapted to receive portions of the surfaces of the balls adjacent thereto. Extending axially through the members 21 and 22 are ports 25, and a port 26 is provided centrally through the spacer 23.

It should be noted that the resilient spacer group 20 is provided in this bearing arrangement so that when the last member is inserted in the series of balls and spacers, the central portions of the members 21 and 22 will be compressed toward the spacer 23 permitting the spacer between two adjacent members of the series to expand while the last member is inserted thereinto. As the last member slips into place the spacer 20 will expand insuring that said adjacent members firmly embrace said last member. The resilient spacer group 20 also permits the series of balls and spacers to expand compensating for any wear of the members making up the series. It should also be noted that the thickness of the spacer 23 forming a part of the resilient spacer group 20 can be arbitrarily chosen so that the members 21 and 22 will be maintained under compression.

With reference now to Fig. 4 wherein is shown the preferred bearing of my invention, parts similar to parts illustrated in Figs. 1 and 2 are designated by like reference characters to which prime marks have been added. This form of my invention differs from the form illustrated in Fig. 1 in that all of the spacers 18 have been replaced by resilient spacers which comprise two dish-shaped resilient members 21' and 22' having their concave sides abutting against each other. The convex sides of the members 21' and 22' contain depressions which embrace portions of the surfaces of the ball 17'. When this type of bearing is employed to facilitate rotation between two members which bear against each other with unevenly distributed forces, the resilient spacers between adjacent balls permit the balls to move with respect to each other as they enter and leave zones of differing loads. Thus, when one of the balls enters a zone of increased load the spacers on either side thereof will permit it to move faster than the ball which is next to entering that zone, and when the former ball leaves a zone of increased load the resilient spacers on either side thereof will permit it to move slower than the latter ball.

Figure 6:
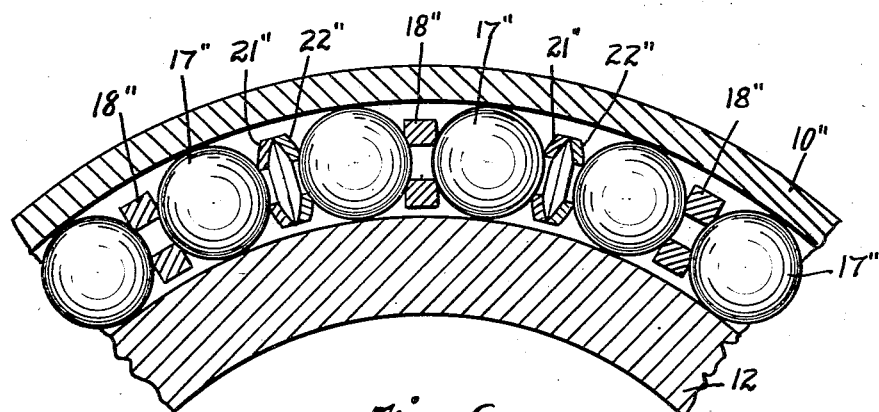
Fig. 6 is a view similar to Figs. 1 and 4 showing another alternative form of the bearing of my invention.

With reference now to Fig. 6 wherein an alternative form of the bearing of my invention is illustrated, parts similar to those illustrated above are designated by similar reference characters to which double prime marks have been added. This bearing differs from the bearings illustrated above in that the series of spacers is made up of alternate rigid spaces 18″ and resilient spacers comprising dish-shaped members 21″ and 22″. This bearing functions similar to the bearing illustrated in Fig. 4 except that two balls which are separated by a rigid spacer 18″ do not move relative to each other. In this bearing the balls move relative to each other in pairs, that is two balls which are separated by a rigid spacer 18″ form a pair and are permitted by the resilient spacer to move relative to a similar pair when the speed of either pair in the raceway is changed.

Figure 5:
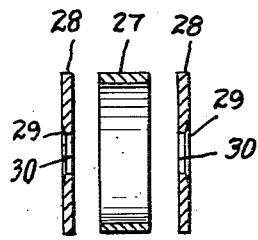
Fig. 5 is an exploded cross-sectional view of an alternative form of the resilient spacer of my invention.

With reference to Fig. 5 wherein is illustrated an alternative form of the resilient spacer of my invention, 27 designates a rigid cylindrical member the center of which is hollow as illustrated, and 28 designates two flat resilient washers which bear against the axially opposed sides of the member 27, each of the washers 28 has a depression 29 in one side thereof adapted to embrace a portion of the surface of the ball adjacent thereto, and the washers contain ports 39 extending centrally therethrough. When the balls on either side of this spacer bear against the spacer the central portions of the washers 28 will be forced into the hollow part of the member 27.

Figure 7:
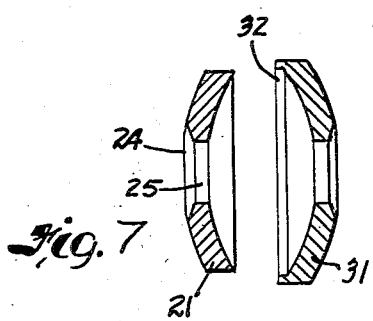
Fig. 7 is an exploded cross-sectional view of another alternative form of the resilient spacer of my invention.

With reference to Fig. 7 wherein is illustrated another alternative form of the resilient spacer of my invention 21 designates a resilient dish-shaped member similar to the member illustrated by that character in Fig. 3, and 31 illustrates a resilient dish-shaped member having an axially extending flange 32 around the periphery thereof. It should be noted that the inside diameter of the flange 32 is greater than the outside diameter of the member 21; this is necessary so that the member 21 may be deformed without deforming the member 31.

My invention provides a bearing in which the balls may move relative to each other. For this reason my bearing permits free movement of the bearing members with which it is used even though said members bear against each other with unevenly distributed forces. Furthermore, since the thickness of the resilient spacers of my invention measured along the circumference of the bearing is very small, a greater number of balls may be employed in the bearing than would be possible with other types of resilient spacers; because a greater number of balls may be used in the bearing, greater loads may be borne by my bearings than by other bearings of the same circumference. Also, because my bearing includes a resiliently deformable spacer, the last member of a compact series may be inserted in the series without damaging the members of the series.

Other modes of applying the principle of the invention may be employed, change being made as regards the details described, provided the features stated in any of the following claims or the equivalent of such be employed.

I, therefore, particularly point out and distinctly claim as my invention:

1. A ball bearing comprising a raceway formed of the complementary ball races in the adjacent faces of two bearing members and a series of alternate balls and spacers in said raceway, one of said spacers comprising two portions defining a cavity centrally therebetween, one of said portions being resiliently deformable centrally thereof toward the other portion and having therein a passageway through said deformable portion from said cavity to the portion of said deformable portion which contacts the ball adjacent thereto.

2. A ball bearing comprising a raceway formed of the complementary ball races in the adjacent faces of two bearing members and a series of alternate balls and spacers in said raceway, one of said spacers comprising two portions defining a cavity centrally therebetween, one of said portions being dish-shaped resiliently deformable centrally thereof toward the other portion and having a depression in the convex side thereof adapted to receive a portion of the surface of the ball adjacent thereto, and a passageway extending through said dish-shaped portion from said cavity to said depression.

3. A ball bearing comprising a raceway formed of the complementary ball races in the adjacent faces of two bearing members and a series of alternate balls and spacers in said raceway, one of said spacers comprising two portions defining a cavity centrally therebetween, each of which portions is resiliently deformable centrally thereof toward the other portion, and a central passageway through each of said portions connected to said cavity.

4. A ball bearing comprising a raceway formed of the complementary ball races in the adjacent faces of two bearing members and a series of alternate balls and spacers in said raceway, one of said spacers comprising two dish-shaped members having their concave sides abutting against each other so as to define a cavity centrally therebetween, and a passageway through each of said members extending from the center of the convex side thereof to said cavity.

5. A ball bearing comprising a raceway formed of the complementary ball races in the adjacent faces of two bearing members and a series of alternate balls and spacers in said raceway, at least one-half of said spacers being resilient spacers and positioned around said raceway so that at least one of said resilient spacers contacts each of said balls in said raceway, said resilient spacers comprising two dish-shaped members having their concave sides abutting against each other so as to define a cavity centrally therebetween, and a passageway through each of said members extending from the center of the convex side thereof to said cavity.

6. A ball bearing comprising a raceway formed of the complementary ball races in the adjacent faces of two bearing members and a series of alternate balls and spacers in said raceway, substantially all of said spacers comprising a plurality of at least three coaxial members juxtaposed together the intermediate members of said plurality being substantially flat discs and the remote members of said plurality being dish-shaped having their convex sides facing away from said intermediate members so as to define a cavity inside said plurality, and an axially extending port extending through each of said members centrally thereof, the convex side of each of said remote members having a depression therein.

7. A ball bearing comprising a raceway formed of the complementary ball races in the adjacent faces of two bearing members and a series of alternate balls and spacers in said raceway, substantially all of said spacers being resilient spacers comprising two dish-shaped members having their concave sides abutting against each other so as to define a cavity centrally therebetween, and a passageway through each of said members extending from the center of the convex side thereof to said cavity.

References Cited in the file of this patent

UNITED STATES PATENTS

| | | |
|---|---|---|
| 1,220,616 | Englerth | Mar. 27, 1917 |
| 1,261,154 | Newmann | Apr. 2, 1918 |
| 2,162,719 | Hay | June 20, 1939 |

FOREIGN PATENTS

| | | |
|---|---|---|
| 124,246 | Great Britain | Mar. 21, 1919 |